Sept. 6, 1927.　　　　　I. C. MOORE　　　　　1,641,348
DRAG
Filed Nov. 27, 1925　　　2 Sheets-Sheet 2
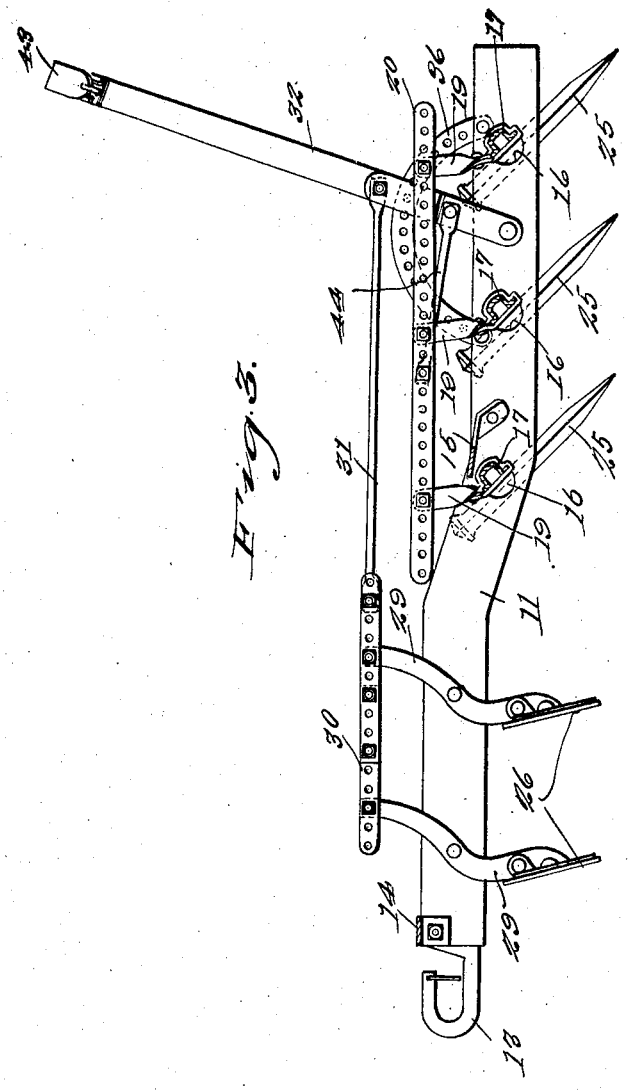

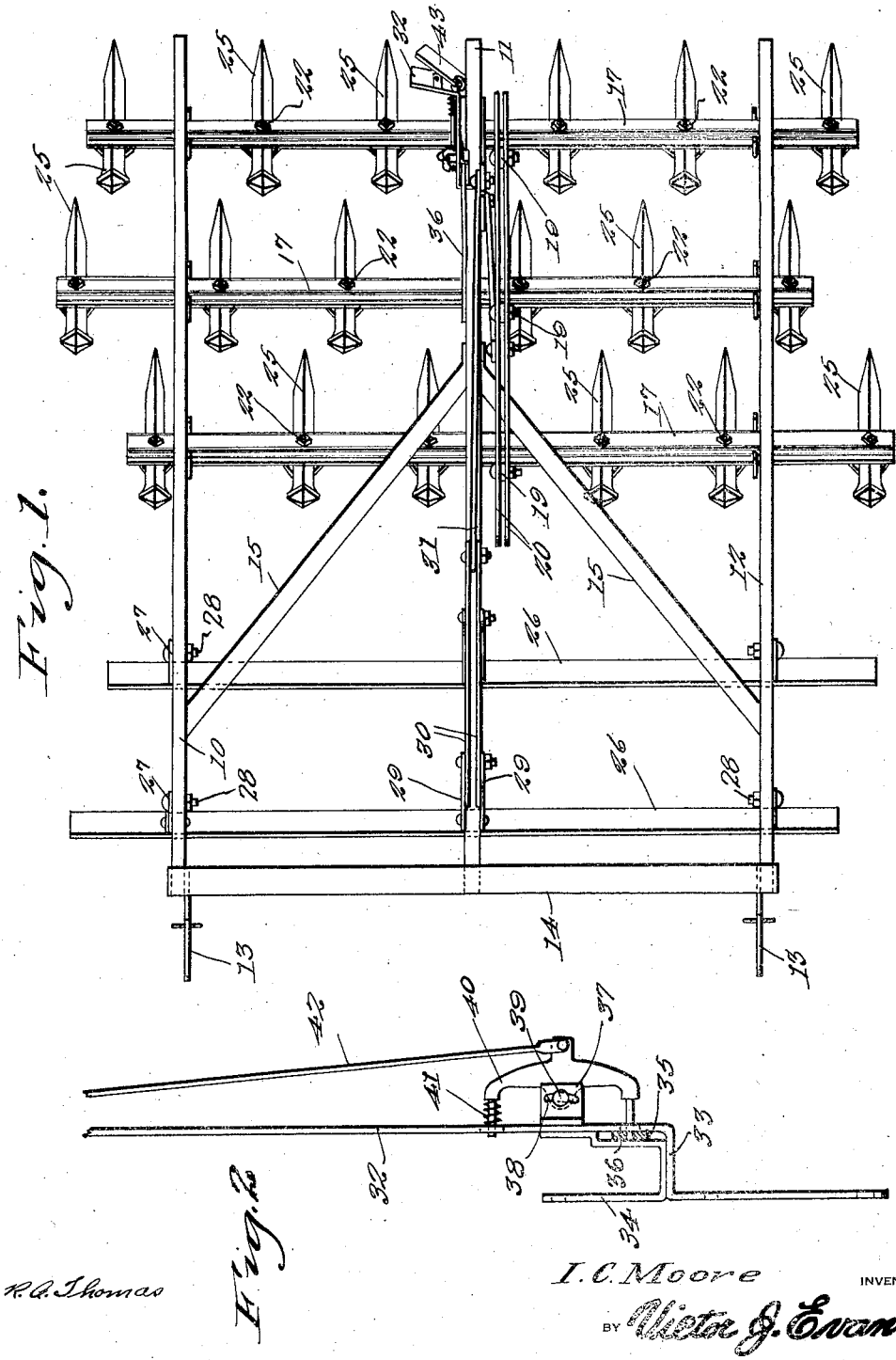

Patented Sept. 6, 1927.

1,641,348

UNITED STATES PATENT OFFICE.

ISAAC C. MOORE, OF CLEO SPRINGS, OKLAHOMA.

DRAG.

Application filed November 27, 1925. Serial No. 71,772.

This invention relates to levers embodying among other characteristics a locking mechanism adapted to check movement of the lever in either direction.

Another object of the invention comprehends means for causing positive engagement of the locking means.

With the above and other objects in view, the invention further consists of the following novel features and details of construction, to be hereinafter more fully described, illustrated in the accompanying drawings and pointed out in the appended claim.

In the drawings:

Figure 1 is a top plan view of the invention as applied for use.

Figure 2 is an elevation of the invention per se.

Figure 3 is an elevation of the invention while in use.

Referring to the drawings in detail, wherein like characters of reference denote corresponding parts, the reference characters 32 indicates an operating handle or lever offset as indicated at 33 and which has supported thereon a substantially U-shaped member 34, the upper end of which being adapted for connection with a brake rod such as indicated at 31 in Figure 3 of the drawings. The opposite end of the U-shaped member 34 is provided with an offset portion to define a space 35 between it and the corresponding side of the operating lever 32 to which the same is attached. An apertured segment 36 being extended within the space 35. The lowermost end of the operating lever 32 is pivoted for rocking movement upon a drag bar 11 as illustrated in Figure 3 of the drawing.

In order to provide means to hold the operating lever in a desired position, I provide spaced parallel ears 37 upon the opposite side which are provided with arcuate shaped registering openings 38, the purpose of which will be presently apparent. A pivot pin 39 being adapted for reception within the arcuate shaped openings 38 and adapted for pivotal and shifting movement therein. A substantially U-shaped locking dog 40 being pivotally mounted for rocking movement upon the pivot pin 39. One end of the dog extended through the operating lever 32 is encircled by a compression spring 41 to normally hold the opposed end in constant engagement with registering openings provided in the lower portion of the operating lever and segment 36.

A releasing mechanism for the dog 40 comprehends a rod 42 having one end pivotally connected with the intermediate portion of the dog and having its upper end connected with a resiliently mounted lever 43 carried upon the upper end of the operating lever 32. The lever 43 when compressed against the operating lever 32 will lift the rod 42 and in turn rock the dog 40 upon its pivot 39 which will in turn impart upward shifting movement of the dog to more effectively insert the upper end of the dog within the operating lever against the tension of the spring 41. Such action will free the opposite end of the dog from operative connection with the segment 36 and lower portion of the operating lever 32 through which said end extends.

Although I have shown, described and illustrated the invention as applied upon a drag frame it is to be understood that I do not limit myself to the particular application of the invention but that the same will be effectively applied for operating the different types of brake mechanisms and which will effectively hold the same against displacement due to the positive engagement of the respective ends of the dog.

The invention is susceptible of various changes in its form, proportions and minor details of construction, and the right is herein reserved to make such changes as properly fall within the scope of the appended claim.

Having thus described the invention, what is claimed is:—

A drag frame having tooth bars, a handle member carried by the frame provided with an offset portion adjacent one end, a U-shaped member carried upon the offset portion of the lever and operatively connected with the tooth bars, ears carried by the handle members disposed in spaced relation, a U-shaped locking dog provided with reduced extensions pivotally mounted at an intermediate point in its length on and between the ears for rocking movement, an apertured segment mounted upon the drag frame and slidably located between the offset portion of the lever and the U-shaped member in the path of movement of one of the extensions, and a spring carried by another of the extensions adapted to normally hold the first mentioned extension in engagement with the segment.

In testimony whereof I affix my signature.

ISAAC C. MOORE.